United States Patent
Wong et al.

(10) Patent No.: US 12,204,623 B2
(45) Date of Patent: Jan. 21, 2025

(54) APPLICATION OPERATION MANAGEMENT AND AUTHENTICATION

(71) Applicant: Logistics and Supply Chain MultiTech R&D Centre Limited, Pok Fu Lam (HK)

(72) Inventors: Kwong Yeung Simon Wong, Pok Fu Lam (HK); Chi Hung Tong, Pok Fu Lam (HK); Chin Chiu Chung, Pok Fu Lam (HK); Sze Man Tong, Pok Fu Lam (HK); Chun On Wong, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 302 days.

(21) Appl. No.: 17/709,834

(22) Filed: Mar. 31, 2022

(65) Prior Publication Data
US 2023/0315824 A1 Oct. 5, 2023

(51) Int. Cl.
*G06F 21/32* (2013.01)
(52) U.S. Cl.
CPC .................... *G06F 21/32* (2013.01)
(58) Field of Classification Search
CPC ..................................................... G06F 21/32
See application file for complete search history.

(56) References Cited

U.S. PATENT DOCUMENTS

| | | | | |
|---|---|---|---|---|
| 8,625,796 | B1* | 1/2014 | Ben Ayed | H04W 12/64 380/258 |
| 8,918,854 | B1* | 12/2014 | Giobbi | G02B 6/0038 726/9 |
| 2011/0289564 | A1* | 11/2011 | Archer | G06F 21/40 726/5 |
| 2016/0028726 | A1* | 1/2016 | Matthews | H04L 63/083 726/5 |
| 2016/0337863 | A1* | 11/2016 | Robinson | H04W 4/021 |
| 2019/0228140 | A1* | 7/2019 | Arroyo | G06V 40/1365 |
| 2019/0349755 | A1* | 11/2019 | Maia | G16H 70/20 |
| 2020/0053096 | A1* | 2/2020 | Bendersky | G06F 21/32 |
| 2020/0142471 | A1* | 5/2020 | Azam | H04M 1/72454 |
| 2020/0258335 | A1* | 8/2020 | Davis | H04W 12/06 |
| 2021/0034834 | A1* | 2/2021 | Mackin | G06F 21/84 |
| 2021/0126912 | A1* | 4/2021 | Maclean | H04W 12/065 |
| 2021/0279320 | A1* | 9/2021 | Robinson | H04L 63/0853 |

* cited by examiner

*Primary Examiner* — Darshan I Dhruv
(74) *Attorney, Agent, or Firm* — Renner, Kenner, Greive, Bobak, Taylor & Weber

(57) ABSTRACT

A computer-implemented method for managing operation of an application includes: authenticating a user of the application or a user device associated with a user of the application; and establishing a session with the application and enabling access to the application for the user if the user or the user device is authenticated. The method further includes determining, after the user or the user device is authenticated, whether the user or the user device is or remains present. The method further includes maintaining the session and the enabling of access to the application if it is determined that the user or the user device is or remains present; and terminating the session and disabling access to the application if it is determined that the user or the user device is absent for a predetermined duration.

22 Claims, 16 Drawing Sheets

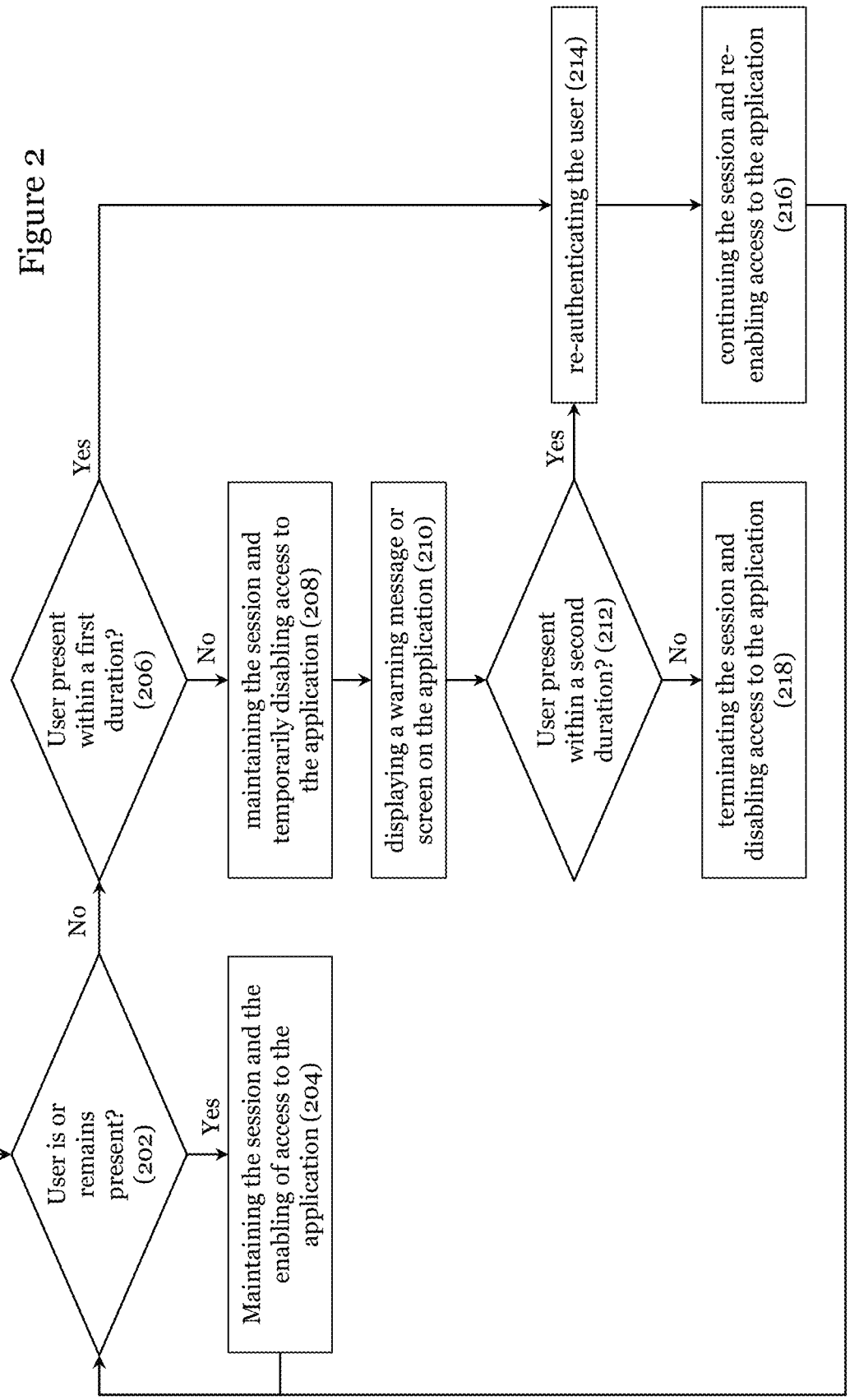

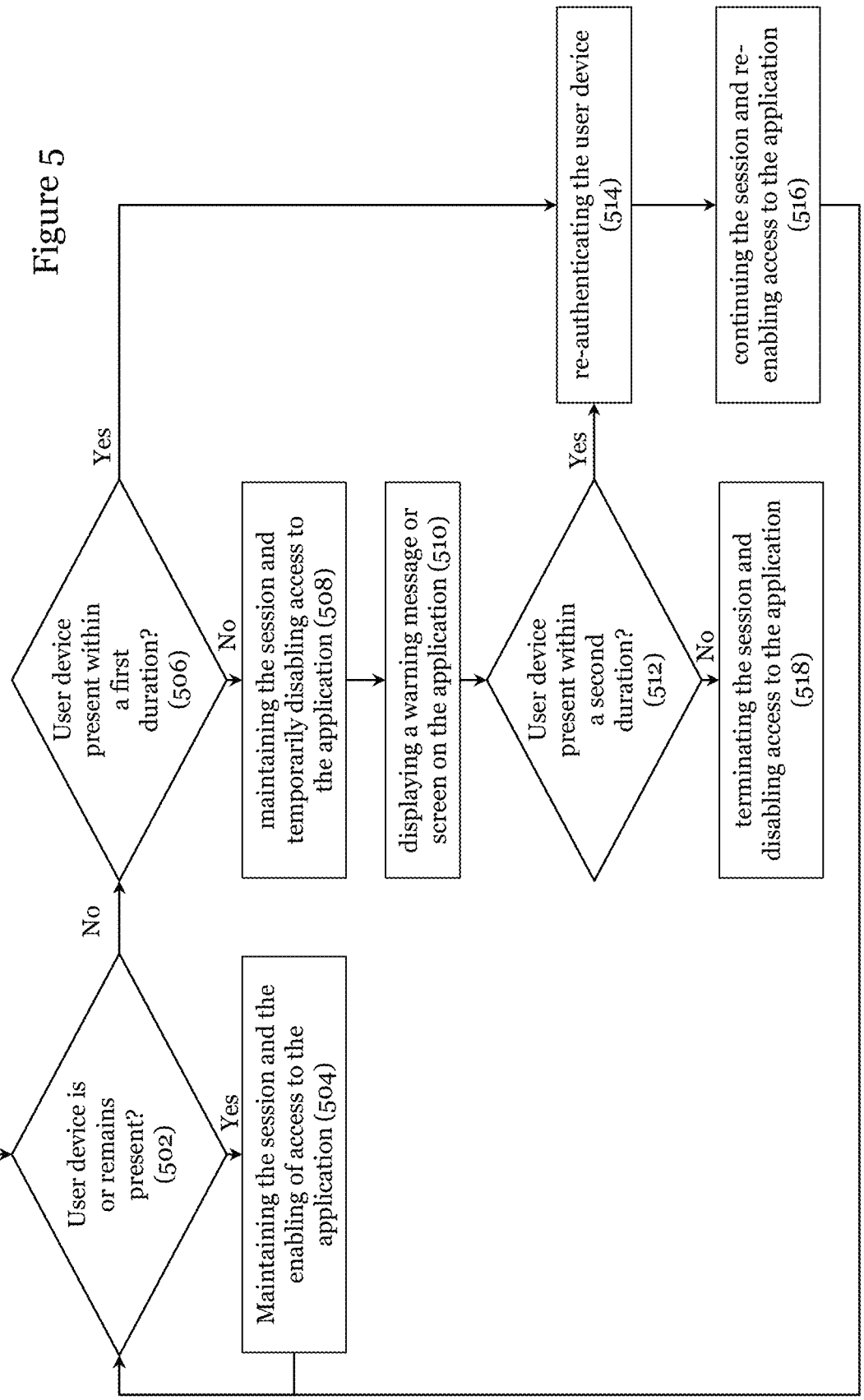

APPLICATION OPERATION MANAGEMENT AND AUTHENTICATION

TECHNICAL FIELD

The invention relates to management of operation and authentication of an application, e.g., a web application.

BACKGROUND

Authentication of user identity is usually required to access applications (e.g., software programs, web applications, etc.) containing sensitive or secure information. Existing authentication techniques mostly rely on either username-password combinations or biometric information. Upon successful authentication, the sensitive or secure information is usually made available to the user until the user logs out of the application.

SUMMARY OF THE INVENTION

In a first aspect, there is provided a computer-implemented method for managing operation of an application, comprising: authenticating a user of the application; establishing a session with the application and enabling access to the application for the user if the user is authenticated; determining, after the user is authenticated, whether the user is or remains present; maintaining the session and the enabling of access to the application if it is determined that the user is or remains present; and terminating the session and disabling access to the application if it is determined that the user is absent for a predetermined duration.

Optionally, the authenticating of the user comprises: authenticating the user based on biometric information of the user.

Optionally, the biometric information of the user comprises at least one of: fingerprint information, palm print information, facial information, iris information, finger vein pattern information, palm vein pattern information, retina information, scleral vein information, gait information, hand geometry information, finger geometry information, keystroke information, and voice information.

Optionally, the authentication of the user is further based on motion or movement information of the user.

Optionally, the authenticating of the user is performed via or by a user device operably connected with an electronic device on which the application is run. The user device may be an electronic device including a camera, e.g., a phone, a tablet, a computer, etc. The electronic device may be any information handling device, e.g., a computer, a tablet, a phone, a watch, etc. The user device may or may not be the same device as the electronic device.

Optionally, determining whether the user is or remains present comprises determining whether the user is or remains in proximity of an electronic device on which the application is run. In one example, the user is or remains in proximity of the electronic device if the user is or remains in the view of the camera of the user device.

Optionally, the computer-implemented method further comprises: providing an alert if it is determined that the user is absent or upon determining that the user is absent. The alert may be an audible alert (sound, continuous or intermittent), a visual alert (light), and/or a tactile alert (vibration, continuous or intermittent).

Optionally, the alert is provided at the user device and/or the electronic device.

Optionally, the predetermined duration is a first predetermined duration; and the computer-implemented method further comprises: maintaining the session and temporarily disabling access to the application if it is determined that the user is absent for a second predetermined duration shorter than the first predetermined duration. The first and second predetermined durations may be in the order of seconds.

Optionally, the computer-implemented method further comprises displaying a warning message or screen on the application if it is determined that the user is absent for the second predetermined duration. In one example, the warning message or screen may occupy a full screen of the application to hide other information of the application from view.

Optionally, the computer-implemented method further comprises: re-authenticating the user of the application if the user is determined to be absent and then present again before the predetermined duration elapses; and continuing the session and re-enabling access to the application if the user is re-authenticated. The re-authentication may be a repeat of the authentication (e.g., based on biometrics and optionally motion/movement of user).

Optionally, the authentication of the user is performed after the user has logged on to the application. In one example, the user has logged on to the application using username-password, biometrics, or other authentication means.

Optionally, the application comprises a secured application that requires user authentication prior to providing access. In one example, the secured application is one that include data and/or information that can be manipulated (e.g., inputted, modified, etc.) by the user.

Optionally, the application is a web application, e.g., run on a browser.

Optionally, the application is a software program.

Optionally, the application is a dispute resolution, mediation, and/or arbitration application or platform.

In a second aspect, there is provided a computer-implemented method for managing operation of an application, comprising: authenticating a user device associated with a user of the application; establishing a session with the application and enabling access to the application for the user if the user device is authenticated; determining, after the user device is authenticated, whether the user device is or remains present; maintaining the session and the enabling of access to the application if it is determined that the user device is or remains present; and terminating the session and disabling access to the application if it is determined that the user device is absent for a predetermined duration. The user device may be an electronic device including a camera, e.g., a phone, a tablet, a computer, etc. The application may be run on an electronic device, which may be any information handling device, e.g., a computer, a tablet, a phone, a watch, etc.

Optionally, authenticating the user device comprises: establishing a communication link between the user device and an electronic device on which the application is run.

Optionally, the communication link comprises a wireless communication link. The wireless communication link may be a Bluetooth communication link, a near field communication link, a Wi-Fi communication link, a cellular communication link, a ZigBee communication link, an RFID communication link, etc.

Optionally, determining whether the user device is or remains present comprises determining whether the user device is or remains in proximity of an electronic device on which the application is run.

Optionally, determining whether the user device is or remains present comprises determining whether the communication link between the user device and the electronic device is maintained.

Optionally, determining whether the user device is or remains present comprises determining whether a signal strength of the communication link between the user device and the electronic device is dropped to below a threshold.

Optionally, the computer-implemented method further comprises: providing an alert if it is determined that the user device is absent or upon determining that the user device is absent. The alert may be an audible alert (sound, continuous or intermittent), a visual alert (light), and/or a tactile alert (vibration, continuous or intermittent).

Optionally, the alert is provided at the user device and/or the electronic device.

Optionally, the predetermined duration is a first predetermined duration; and the computer-implemented method further comprises: maintaining the session and temporarily disabling access to the application if it is determined that the user device is absent for a second predetermined duration shorter than the first predetermined duration. The first and second predetermined durations may be in the order of seconds.

Optionally, the computer-implemented method further comprises displaying a warning message or screen on the application if it is determined that the user device is absent for the second predetermined duration. In one example, the warning message or screen may occupy a full screen of the application to hide other information of the application from view.

Optionally, the computer-implemented method further comprises: re-authenticating the user device if the user device is determined to be absent and then present again before the predetermined duration elapse; and continuing the session and re-enabling access to the application if the user device is re-authenticated. The re-authentication may be a repeat of the authentication (e.g., based on establishing/re-establishing communication link).

Optionally, the authentication of the user device is performed after the user has logged on to the application. In one example, the user has logged on to the application using username-password, biometrics, or other authentication means.

Optionally, the application comprises a secured application that requires user device authentication prior to providing access. In one example, the secured application is one that include data and/or information that can be manipulated (e.g., inputted, modified, etc.) by the user.

Optionally, the application is a web application, e.g., run on a browser.

Optionally, the application is a dispute resolution, mediation, and/or arbitration application or platform.

In a third aspect there is provided a non-transitory computer readable medium storing instructions that, when executed by one or more processors, causes the one or more processors to perform the computer-implemented method of the first aspect.

In a fourth aspect there is provided a non-transitory computer readable medium storing instructions that, when executed by one or more processors, causes the one or more processors to perform the computer-implemented method of the second aspect.

In a fifth aspect there is provided a system for managing operation of an application. The system comprises one or more processors arranged to: authenticate a user of the application; establish a session with the application and enabling access to the application for the user if the user is authenticated; determine, after the user is authenticated, whether the user is or remains present; maintain the session and the enabling of access to the application if it is determined that the user is or remains present; and terminate the session and disabling access to the application if it is determined that the user is absent for a predetermined duration. The one or more processors may be arranged on a single apparatus or distributed across two or more apparatuses.

Optionally, the one or more processors are arranged to authenticate the user based on biometric information of the user.

Optionally, the biometric information of the user comprises at least one of: fingerprint information, palm print information, facial information, iris information, finger vein pattern information, palm vein pattern information, retina information, scleral vein information, gait information, hand geometry information, finger geometry information, keystroke information, and voice information.

Optionally, the one or more processors are arranged to authenticate the user further based on detected motion or movement information of the user.

Optionally, the one or more processors are arranged partly in a user device operably connected with an electronic device on which the application is run and partly in the electronic device. The user device may be an electronic device including a camera, e.g., a phone, a tablet, a computer, etc. The electronic device may be any information handling device, e.g., a computer, a tablet, a phone, a watch, etc. The user device may or may not be the same device as the electronic device.

Optionally, the one or more processors are arranged to determine whether the user is or remains present based on determining whether the user is or remains in proximity of an electronic device on which the application is run. In one example, the one or more processors are arranged to determine that the user is or remains in proximity of the electronic device if the user is or remains in the view of the camera of the user device.

Optionally, the system further comprises an alert module arranged to generate an alert if it is determined that the user is absent or upon determining that the user is absent. The alert may be an audible alert (sound, continuous or intermittent), a visual alert (light), and/or a tactile alert (vibration, continuous or intermittent).

Optionally, the alert is provided at the user device and/or the electronic device.

Optionally, the predetermined duration is a first predetermined duration; and the one or more processors are arranged to: maintain the session and temporarily disable access to the application if it is determined that the user is absent for a second predetermined duration shorter than the first predetermined duration. The first and second predetermined durations may be in the order of seconds.

Optionally, the system further comprises a display arranged to display a warning message or screen on the application if it is determined that the user is absent for the second predetermined duration. In one example, the warning message or screen may occupy a full screen of the application to hide other information of the application from view.

Optionally, the one or more processors are arranged to re-authenticate the user of the application if the user is determined to be absent and then present again before the predetermined duration elapses; and continue the session and re-enable access to the application if the user is re-authenticated. The re-authentication may be a repeat of the authentication (e.g., based on biometrics and optionally motion/movement of user).

Optionally, the authentication of the user is performed after the user has logged on to the application. In one example, the user has logged on to the application using username-password, biometrics, or other authentication means.

Optionally, the application comprises a secured application that requires user authentication prior to providing access. In one example, the secured application is one that include data and/or information that can be manipulated (e.g., inputted, modified, etc.) by the user.

Optionally, the application is a web application, e.g., run on a browser.

Optionally, the application is a software program.

Optionally, the application is a dispute resolution, mediation, and/or arbitration application or platform.

In a sixth aspect there is provided a system for managing operation of an application. The system comprises one or more processors arranged to: authenticate a user device associated with a user of the application; establish a session with the application and enabling access to the application for the user if the user device is authenticated; determine, after the user device is authenticated, whether the user device is or remains present; maintain the session and the enabling of access to the application if it is determined that the user device is or remains present; and terminate the session and disabling access to the application if it is determined that the user device is absent for a predetermined duration. The one or more processors may be arranged on a single apparatus or distributed across two or more apparatuses.

Optionally, the one or more processors are arranged partly in a user device operably connected with an electronic device on which the application is run and partly in the electronic device. The user device may be an electronic device including a camera, e.g., a phone, a tablet, a computer, etc. The electronic device may be any information handling device, e.g., a computer, a tablet, a phone, a watch, etc.

Optionally, the one or more processors are arranged to authenticate the user device based on establishing a communication link between the user device and an electronic device on which the application is run.

Optionally, the communication link comprises a wireless communication link. The wireless communication link may be a Bluetooth communication link, a near field communication link, a Wi-Fi communication link, a cellular communication link, a ZigBee communication link, an RFID communication link, etc.

Optionally, the one or more processors are arranged to determine whether the user device is or remains present based on determining whether the user device is or remains in proximity of an electronic device on which the application is run.

Optionally, the one or more processors are arranged to determine whether the user device is or remains present comprises based on determining whether the communication link between the user device and the electronic device is maintained.

Optionally, the one or more processors are arranged to determine whether the user device is or remains present based on determining whether a signal strength of the communication link between the user device and the electronic device is dropped to below a threshold.

Optionally, the system further comprises an alert module arranged to provide an alert if it is determined that the user device is absent or upon determining that the user device is absent. The alert may be an audible alert (sound, continuous or intermittent), a visual alert (light), and/or a tactile alert (vibration, continuous or intermittent).

Optionally, the alert is provided at the user device and/or the electronic device.

Optionally, the predetermined duration is a first predetermined duration; and the one or more processors are arranged to: maintain the session and temporarily disable access to the application if it is determined that the user device is absent for a second predetermined duration shorter than the first predetermined duration. The first and second predetermined durations may be in the order of seconds.

Optionally, the system further comprises a display for displaying a warning message or screen on the application if it is determined that the user device is absent for the second predetermined duration. In one example, the warning message or screen may occupy a full screen of the application to hide other information of the application from view.

Optionally, the one or more processors are arranged to: re-authenticate the user device if the user device is determined to be absent and then present again before the predetermined duration elapse; and continuing the session and re-enable access to the application if the user device is re-authenticated. The re-authentication may be a repeat of the authentication (e.g., based on establishing/re-establishing communication link).

Optionally, the authentication of the user device is performed after the user has logged on to the application. In one example, the user has logged on to the application using username-password, biometrics, or other authentication means.

Optionally, the application comprises a secured application that requires user device authentication prior to providing access. In one example, the secured application is one that include data and/or information that can be manipulated (e.g., inputted, modified, etc.) by the user.

Optionally, the application is a web application, e.g., run on a browser.

Optionally, the application is a dispute resolution, mediation, and/or arbitration application or platform.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which:

FIG. 2 is a flowchart illustrating a method for managing operation of an application in one embodiment of the invention;

FIG. 5 is a flowchart illustrating a method for managing operation of an application in one embodiment of the invention;

DETAILED DESCRIPTION

Figure 1:
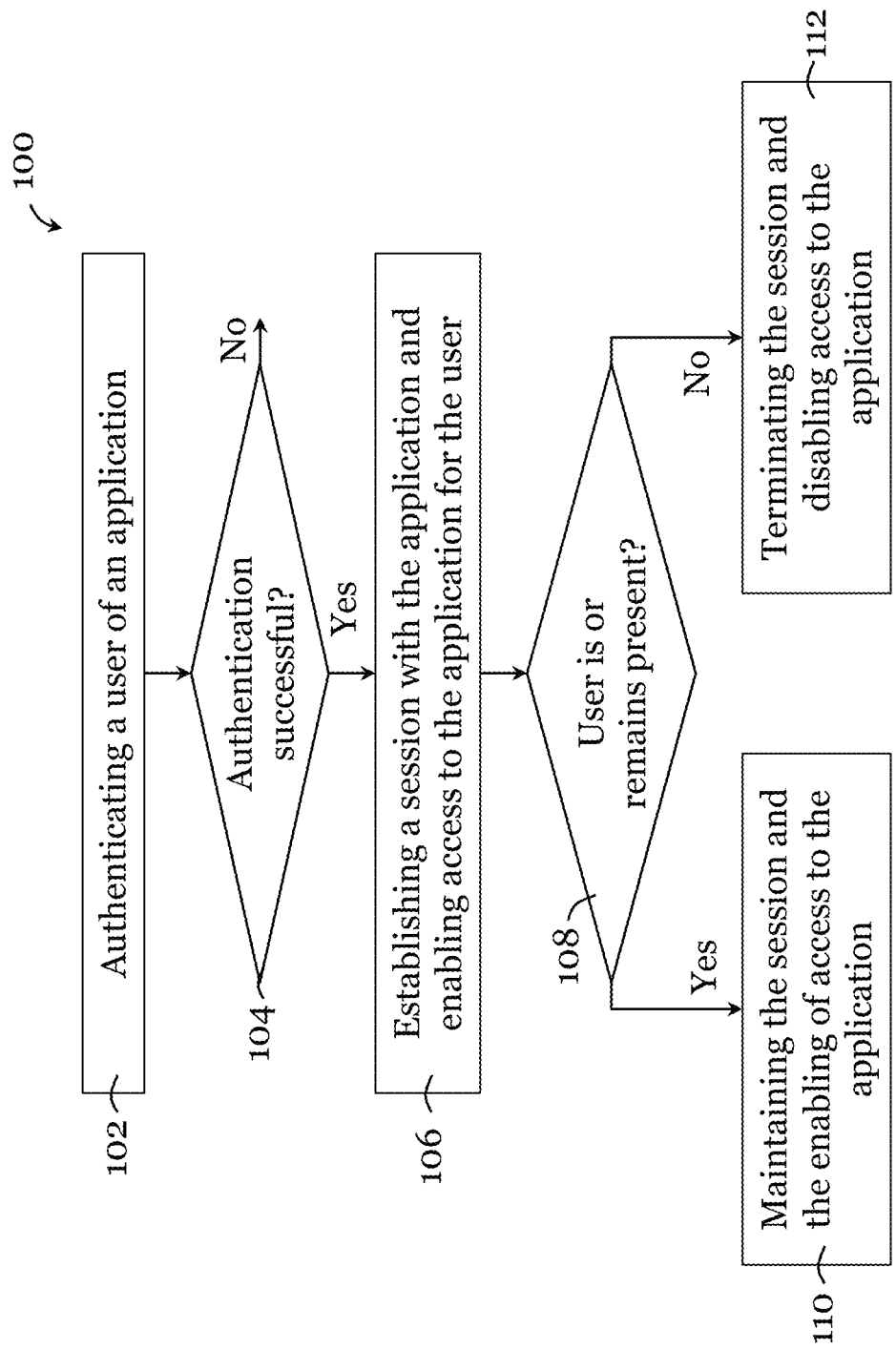
FIG. 1 is a flowchart illustrating a method for managing operation of an application in one embodiment of the invention.

FIG. 1 shows a method too for managing operation of an application in one embodiment of the invention. The application may be a web application, e.g., run on a browser, a software program, etc. In this embodiment, the application is a dispute resolution, mediation, and/or arbitration application that can be run on a browser on an electronic device (e.g., computer).

The method too begins in step 102, which involves authenticating the user of the application. The authentication of the user may be performed based on biometric information of the user. In one example, biometric information is obtained from the user, and is compared against a database of authorized user identities, to determine whether the user is allowed to access the application. The biometric information used may be fingerprint information, palm print information, facial information, iris information, finger vein pattern information, palm vein pattern information, retina information, scleral vein information, gait information, hand geometry information, finger geometry information, keystroke information (typing of keyboard by the user), and/or voice information. The authentication of the user may be performed based additionally on motion or movement information of the user. In one example, the user is imaged by a camera arranged to detect the user's motion or movement. In another example, the user is monitored by a motion tracker arranged to track the user's motion or movement. The biometric information and/or motion or movement information of the user may be obtained by a user device (e.g., mobile phone) operably connected with the electronic device. Step 102 may be performed after the user has logged on to the application (e.g., using username-password combinations, biometrics, or other authentication means) and before the user can access sensitive or secure information or manipulate data in or via the application.

After step 102, in step 104, a determination is made as to whether the authentication is successful. If the authentication is unsuccessful, e.g., the user is not recognized or is recognized as not authorized to access the application, then the method too ends. If the authentication is successful, then in step 106, a session (or user session) with the application is established and the access to the application is enabled (i.e., the user can access the application).

After the user is authenticated in step 106, in step 108, a determination is made as to whether the user is or remains present. This determination may be made by the electronic device based on its idle time, by the user device based on user becoming out of view of the camera of the device (e.g., no longer captured by the camera of the device), etc. In one example, the determination involves determining whether the user is or remains in proximity of an electronic device on which the application is run.

If in step 108 it is determined that the user is or remains present then the method too proceeds to step 110 in which the session and the enabling of access to the application are maintained. Alternatively, if in step 108 it is determined that the user is absent for a predetermined duration (e.g., for sufficiently long time), then the method too proceeds to step 112 in which the session is terminated and the access to the application is disabled. In one example, afterwards, the user will have to log-in the application again and repeat method too in order to gain access to the application.

FIG. 2 shows a method 200 for managing operation of an application in one embodiment of the invention. The method 200 in FIG. 2 can be used to replace steps 108-112 in the method too of FIG. 1. In the context of FIG. 2, at the beginning, a session with the application has been established and access to the application has been enabled, like in step 106 of FIG. 1.

Method 200 begins in step 202, in which a determination is made as to whether the user is or remains present. This step 202 is the same as or similar to the step 108 in FIG. 1. For brevity the details are not repeated here.

If in step 202, it is determined that the user is or remains present, then the method 200 proceeds to step 204, in which the session and the enabling of access to the application are maintained, and the method 200 will go back to step 202 to further (e.g., continuously, regularly, intermittently, etc.) determine whether the user is or remains present.

If in step 202, it is determined that the user is absent, then the method 200 proceeds to step 206, to determine whether the user is present within a first duration (e.g., several seconds) after determining that the user is absent. In one example, if the user returns to the view of the user device or its camera within the first duration, then the user is determined to be present (re-appear) within the first duration.

If in step 206 it is determined that the user becomes present within the first duration, then the method 200 proceeds to step 214, in which the user is re-authenticated, and upon successful re-authentication, in step 216, the session is continued and access to the application is re-enabled. The re-authentication may be the same as or similar to the authentication described with reference of step 102 in FIG. 1 (e.g., based on biometrics and optionally motion/movement of user). The method 200 then proceeds back to step 202 to further (e.g., continuously, regularly, intermittently, etc.) determine whether the user is or remains present.

If in step 206 it is determined that the user does not become present within the first duration, then the method 200 proceeds to step 208, in which the session is maintained and the access to the application is temporarily disabled, and to step 210, in which a warning screen or message is displayed on the application interface. The disabling of access may include freezing of the screen, showing a dummy screen, etc. The disabling of access may include displaying the warning screen or message, which may hide some or all of the information of the application interface.

In step 212, the method 200 determines whether the user is present within a second duration (longer than the first duration) after determining that the user is absent. In one example, if the user returns to the view of the user device or its camera within the second duration, then the user is determined to be present (re-appear) within the second duration.

If in step 212 it is determined that the user becomes present within the second duration, then the method 200 proceeds to step 214, in which the user is re-authenticated, and upon successful re-authentication, in step 216, the session is continued and access to the application is re-enabled. The re-authentication may be the same as or similar to the authentication described with reference of step 102 in FIG. 1 (e.g., based on biometrics and optionally motion/ movement of user). The method 200 then proceeds back to step 202 to further (e.g., continuously, regularly, intermittently, etc.) determine whether the user is or remains present.

If in step 212 it is determined that the user is still absent for the second duration, or the user does not become present within the second duration, then the method 200 proceeds to step 218, in which the session is terminated and the access to the application is disabled.

Although not illustrated, in method 200, if it is determined that the user is absent or upon determining that the user is absent (e.g., becomes out of view of the camera of the user device), an alarm (audible, visual, tactile, or any of their combination) may be provided to alert the user of the potential termination of the session and disabling of the access to the application. Provided that the user is determined to be present again within the second duration, the session can be continued and the access can be re-enabled, without session timeout.

FIGS. 3A to 3E illustrate one exemplary implementation of the methods 100, 200 in FIGS. 1 and 2. As shown in FIGS. 3A to 3E, the system includes a laptop computer 10 running the application in the form of a web app, and a mobile phone 20 running an authentication app. The laptop computer 10 is operably connected with the mobile phone 20, via a direct communication link (wired and/or wireless) and/or an indirect communication link (via a server).

Figure 3A:
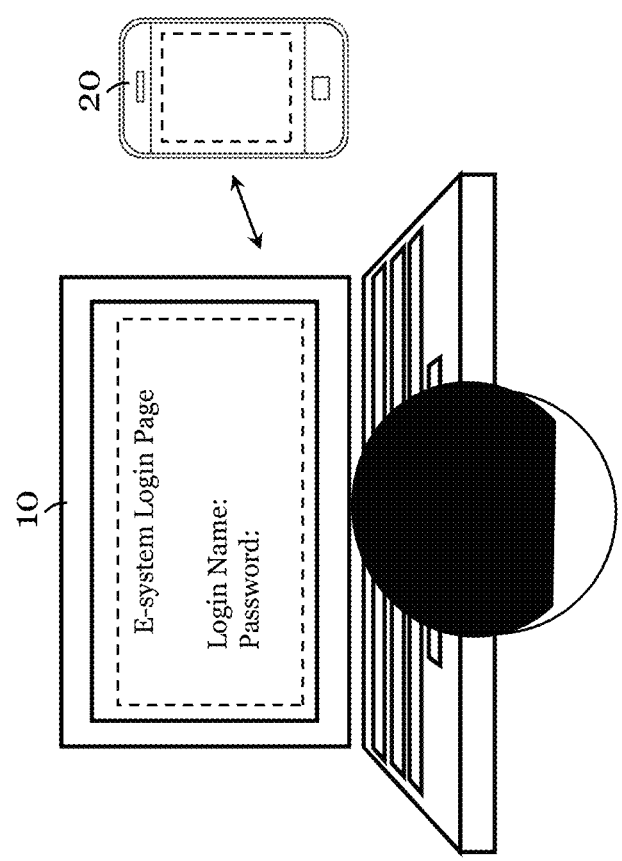
FIGS. 3A to 3E are schematic diagrams illustrating an implementation of a method for managing operation of an application in one embodiment of the invention.
Figure 3B:
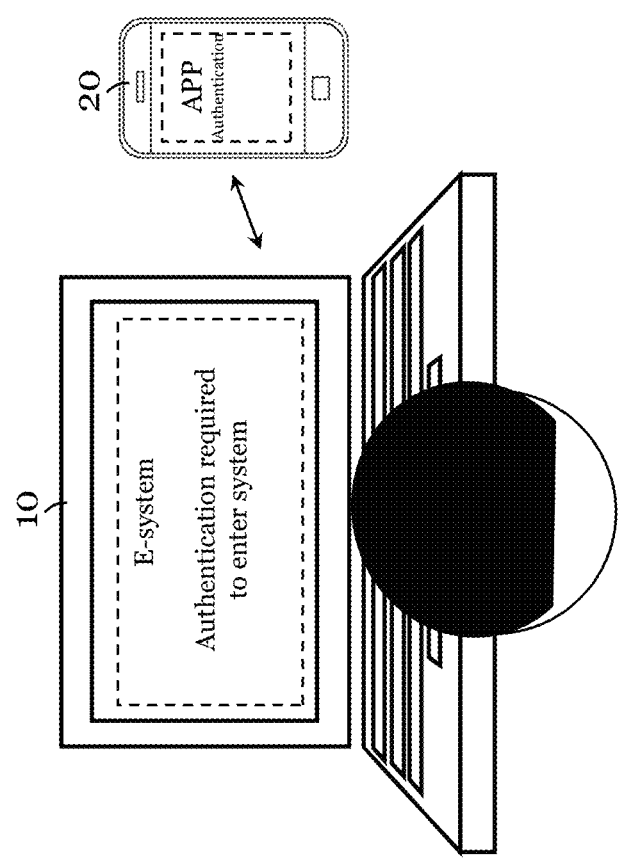
Figure 3C:
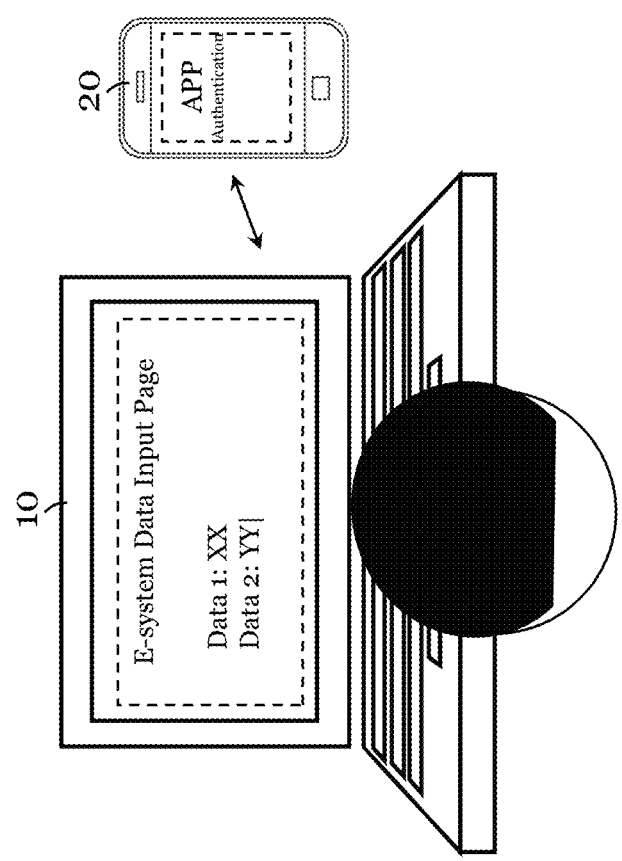
Figure 3D:
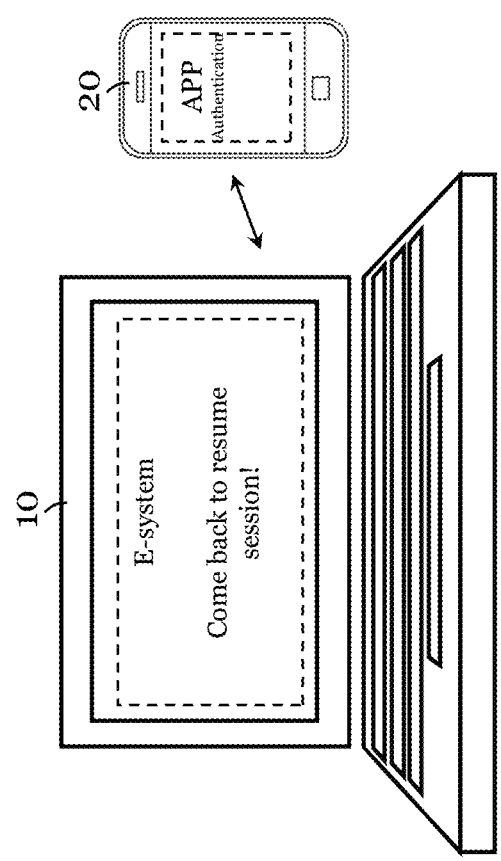
Figure 3E:
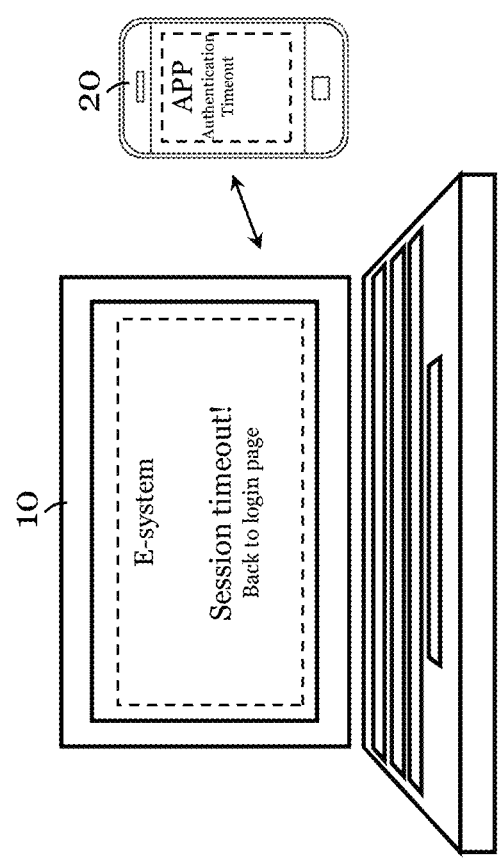

In FIG. 3A, the user is logging in to the application ("E-system") on the computer 10. In this example, the login is based on username and password. After successfully logging in, in FIG. 3B, the application on the computer 10 displays a screen that indicates that authentication is required to further access the application. The user opens the authentication app on the phone 20 and authenticates himself/herself based on biometrics and optionally motion/movement as described with reference to FIGS. 1 and 2. The phone 20 receives the biometrics and optionally motion/movement information of the user, and authenticates the user locally, with a server, or with the computer 10. After successful authentication, in FIG. 3C, the user is able to access an information and/or data manipulation page of the application. The user can input data to the page via the computer 10. In FIG. 3D, the user has moved away from the computer 10 and phone 20. The phone 20, upon failing to detect the user via its camera, determines that the user is away. The phone 20 informs the computer 10, or the server, that the user is away or not present. As a result, after a determined amount of time has passed after determining the user is not present, the application shows a warning message or screen. The phone 20 and/or the computer 10 may provide an audible alarm to alert the user to return to the computer 10 and phone 20 to prevent unwanted session timeout. In FIG. 3E, the user has not returned to the computer 10 and phone 20 for a session timeout duration, hence the session is terminated and access to the application is disabled.

Figure 4:
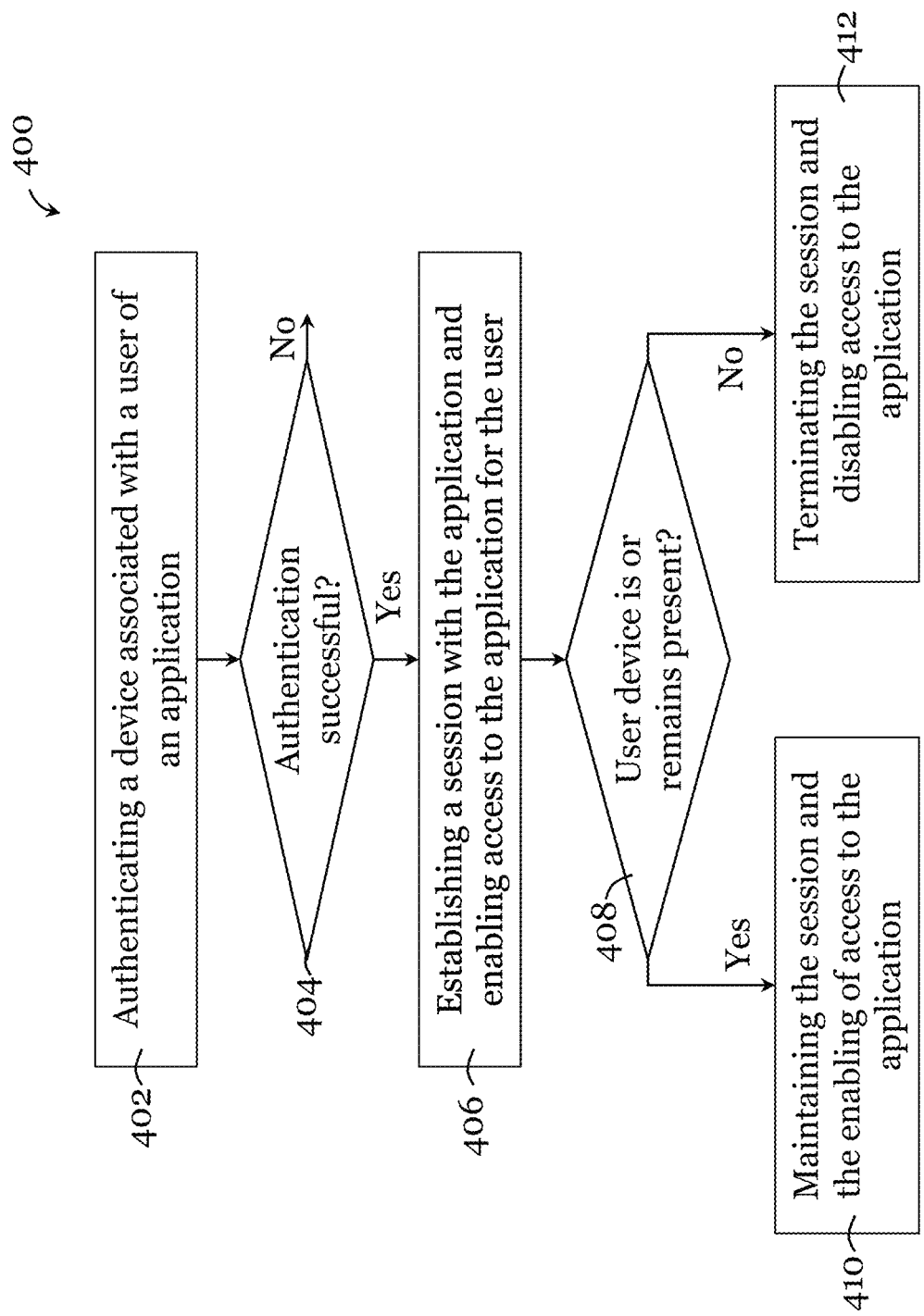
FIG. 4 is a flowchart illustrating a method for managing operation of an application in one embodiment of the invention.

FIG. 4 shows a method 400 for managing operation of an application in one embodiment of the invention. The application may be a web application, e.g., run on a browser, a software program, etc. In this embodiment, the application is a dispute resolution, mediation, and/or arbitration application that can be run on a browser on an electronic device (e.g., computer).

The method 400 begins in step 402, which involve authenticating a device (also called "user device") associated with a user of the application. The authentication of the user device may be performed based on establishing a communication link between the user device and an electronic device on which the application is run. The communication link may be a wireless communication link, e.g., a Bluetooth communication link, a near field communication link, a Wi-Fi communication link, a cellular communication link, a ZigBee communication link, an RFID communication link, etc. Step 402 may be performed after the user has logged on to the application (e.g., using username-password combinations, biometrics, or other authentication means) and before the user can access sensitive or secure information or manipulate data in or via the application.

After step 402, in step 404, a determination is made as to whether the authentication is successful. If the authentication is unsuccessful, e.g., the user device is not recognized or is recognized as not authorized to access the application, then the method 400 ends. If the authentication is successful, then in step 406, a session (or user session) with the application is established and the access to the application is enabled (i.e., the user can access the application).

After the user device is authenticated in step 406, in step 408, a determination is made as to whether the user device is or remains present. This determination may be made by the electronic device and/or the user device based on the presence or maintaining of communication link between the user device and the electronic device, based on comparison of a signal strength of the communication link between the user device and the electronic device with a threshold, etc. In one example, the determination involves determining whether the user device is or remains in proximity of an electronic device on which the application is run.

If in step 408 it is determined that the user device is or remains present then the method 400 proceeds to step 410 in which the session and the enabling of access to the application are maintained. Alternatively, if in step 408 it is determined that the user device is absent for a predetermined duration (e.g., for sufficiently long time), then the method 400 proceeds to step 412 in which the session is terminated and the access to the application is disabled. In one example, afterwards, the user will have to log-in the application again and repeat method 400 in order to gain access to the application.

FIG. 5 shows a method 500 for managing operation of an application in one embodiment of the invention. The method 500 in FIG. 5 can be used to replace steps 408-412 in the method 100 of FIG. 4. In the context of FIG. 5, at the beginning, a session with the application has been established and access to the application has been enabled, like in step 406 of FIG. 4.

Method 500 begins in step 502, in which a determination is made as to whether the user device is or remains present. This step 502 is the same as or similar to the step 408 in FIG. 4. For brevity the details are not repeated here.

If in step 502, it is determined that the user device is or remains present, then the method 500 proceeds to step 504, in which the session and the enabling of access to the application are maintained, and the method 500 will go back to step 502 to further (e.g., continuously, regularly, intermittently, etc.) determine whether the user device is or remains present.

If in step 502, it is determined that the user device is absent, then the method 500 proceeds to step 506, to determine whether the user device is present within a first duration (e.g., several seconds) after determining that the user device is absent. In one example, if the user device returns to the proximity of the electronic device running the application within the first duration, the communication link is restored or strengthened, and the user device is determined to be present (re-appear) within the first duration.

If in step 506 it is determined that the user device becomes present within the first duration, then the method 500 proceeds to step 514, in which the user device is re-authenticated, and upon successful re-authentication, in step 516, the session is continued and access to the application is re-enabled. The re-authentication may be the same as or similar to the authentication described with reference of step 402 in FIG. 4 (e.g., based on presence or strength of communication link between the user device and the electronic device). The method 500 then proceeds back to step 502 to further (e.g., continuously, regularly, intermittently, etc.) determine whether the user device is or remains present.

If in step 506 it is determined that the user device does not become present within the first duration, then the method 500 proceeds to step 508, in which the session is maintained by the access to the application is temporarily disabled, and to step 510, in which a warning screen or message is displayed on the application interface. The disabling of access may include freezing of the screen, showing a dummy screen, etc. The disabling of access may include displaying the warning screen or message, which may hide some or all of the information of the application interface.

In step 512, the method 500 determines whether the user device is present within a second duration (longer than the first duration) after determining that the user device is absent. In one example, if returns to the proximity of the electronic device running the application within the second duration, the communication link is restored or strengthened, and the user is determined to be present within the second duration.

If in step 512 it is determined that the user device becomes present within the second duration, then the method 500 proceeds to step 514, in which the user device is re-authenticated, and upon successful re-authentication, in step 516, the session is continued and access to the application is re-enabled. The re-authentication may be the same as or similar to the authentication described with reference of step 402 in FIG. 4 (e.g., based on presence or strength of communication link between the user device and the electronic device). The method 500 then proceeds back to step 502 to further (e.g., continuously, regularly, intermittently, etc.) determine whether the user device is or remains present.

If in step 512 it is determined that the user device is still absent for the second duration, or the user device does not become present within the second duration, then the method 500 proceeds to step 518, in which the session is terminated and the access to the application is disabled.

Although not illustrated, in method 500, if it is determined that the user device is absent or upon determining that the user is absent (e.g., the user device becomes out of communication range with the electronic device), an alarm (audible, visual, tactile, or any of their combination) may be provided to alert the user of the potential termination of the session and disabling of the access to the application. Provided that the user device is determined to be present again within the second duration, the session can be continued and the access can be re-enabled, without session timeout.

FIGS. 6A to 6F illustrate one exemplary implementation of the methods of FIGS. 4 and 5. As shown in FIGS. 6A to 6F, the system includes a laptop computer 30 running the application in the form of a web app, and a mobile phone 40 running a connection app. The laptop computer 30 is operably connected with the mobile phone 40, via a direct communication link (wired and/or wireless), e.g., Bluetooth® communication link.

Figure 6A:
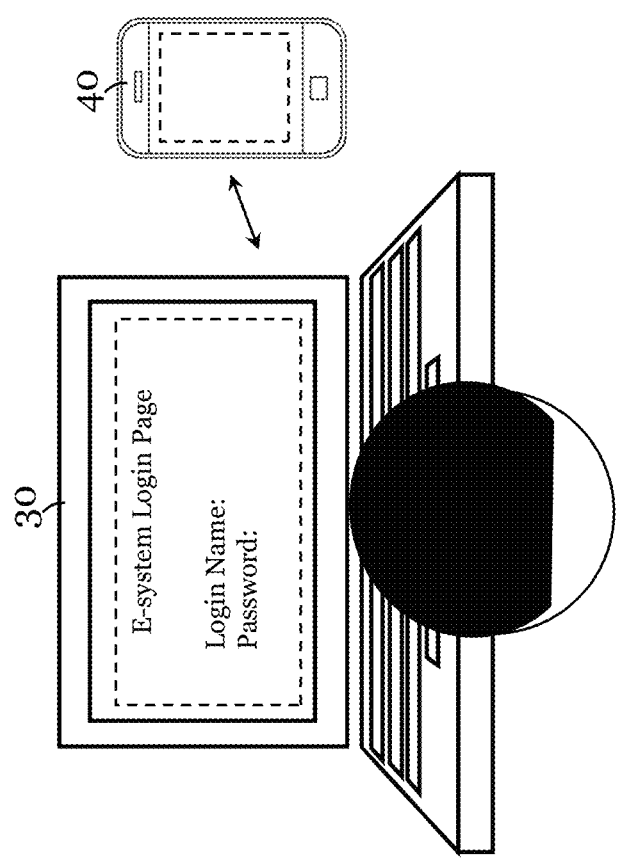
FIGS. 6A to 6F are schematic diagrams illustrating an implementation of a method for managing operation of an application in one embodiment of the invention.
Figure 6B:
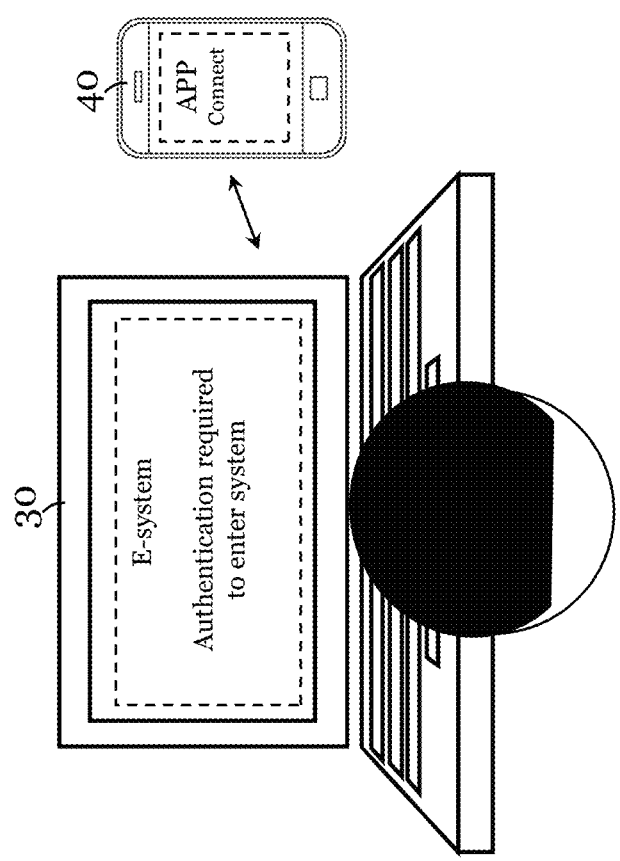
Figure 6C:
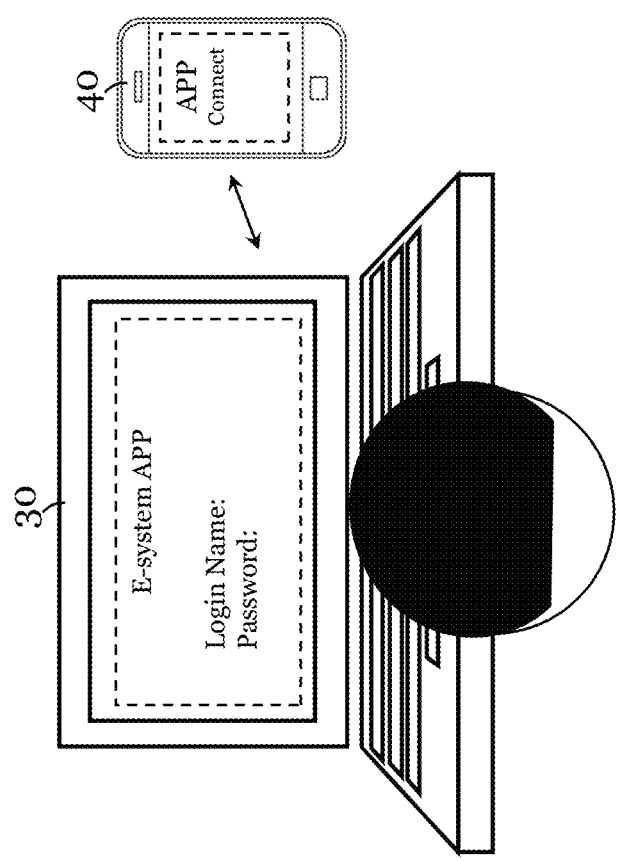
Figure 6D:
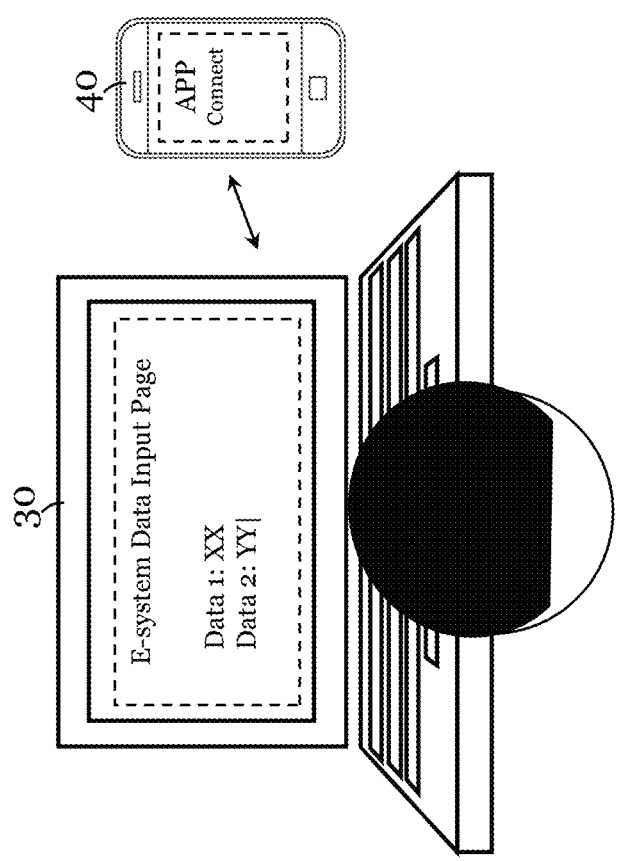
Figure 6E:
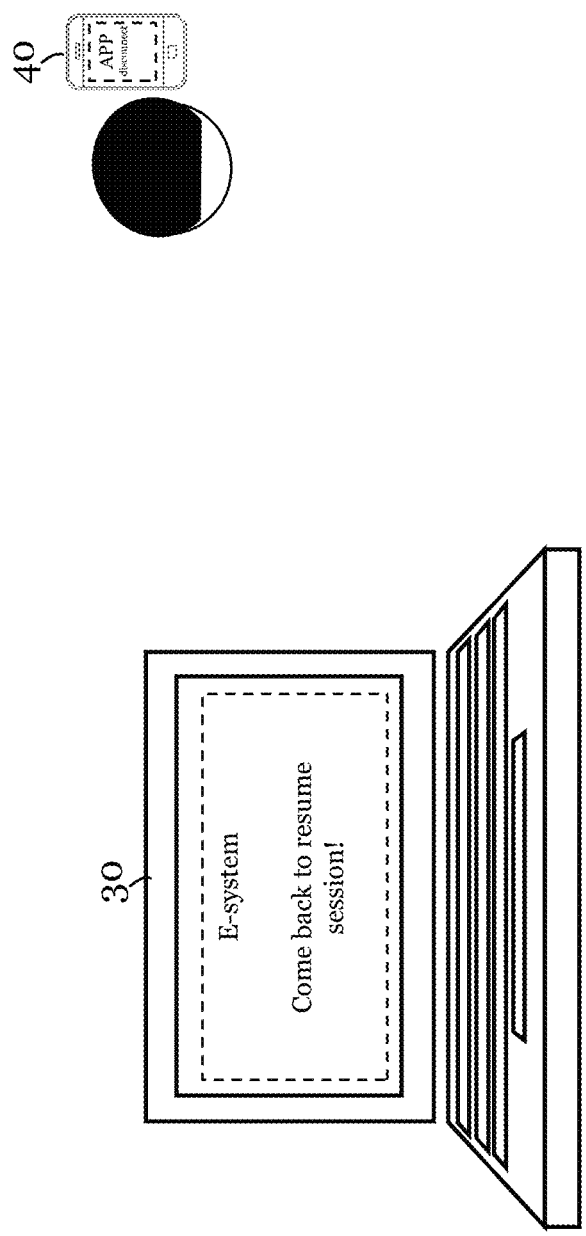
Figure 6F:
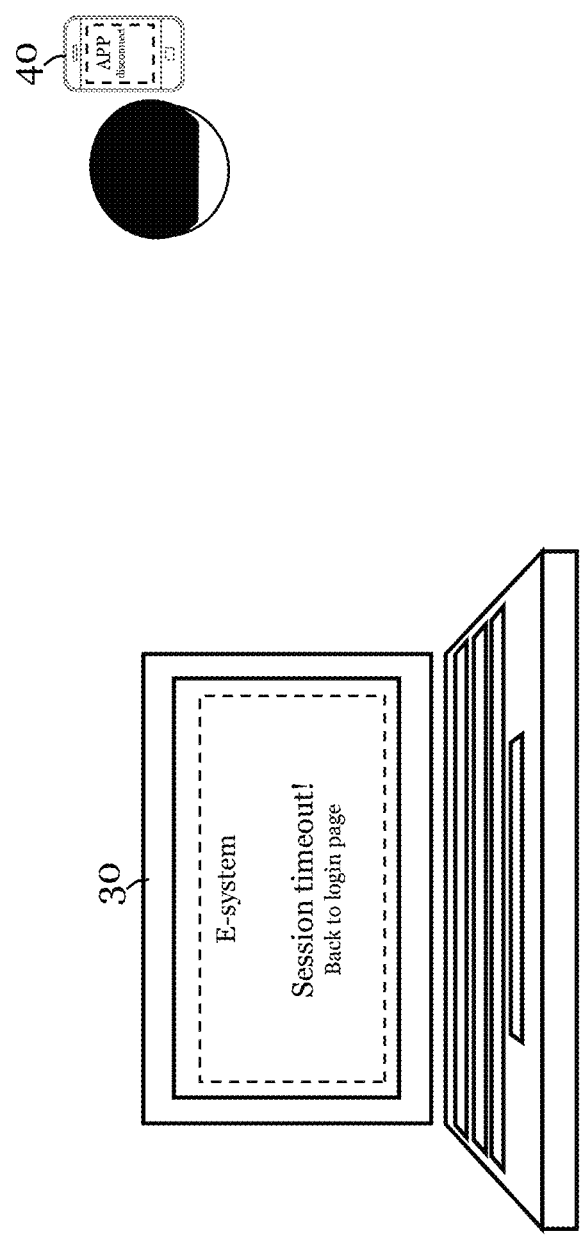

In FIG. 6A, the user is logging in to the application ("E-system") on the computer 30. In this example, the login is based on username and password. After successfully logging in, in FIG. 6B, the application on the computer 30 displays a screen that indicates that authentication is required to further access the application. In FIG. 6C, the user opens a desktop app of the application on the computer 30 and login based on username and password, as well as opens the connection app on the phone 40, so as to establish a communication link, e.g., Bluetooth® communication link, between the phone 40 and the computer 30, as described with reference to FIGS. 4 and 5. After successfully establishing the communication link, in FIG. 6D, the user is able to access an information and/or data manipulation page of the application. The user can input data to the page via the computer 30. In FIG. 6E, the user has taken the phone 40 and has moved away from the computer 30 such that the phone 40 is away from the computer 30. The phone 40, upon failing to establish a connection link with the computer 30, determines that it is away from the computer 30. Likewise, the computer 30, upon failing to establish a connection link with the phone 40, determines that it is away from the phone 40. As a result, the communication link is lost, or weakened below a threshold signal strength. After a determined amount of time has passed after determining the user device is not present, the application on the computer 30 shows a warning message or screen. The phone 40 may provide an audible alarm to alert the user to return to the computer 30 with the phone 40 to prevent unwanted session timeout. In FIG. 6F, the user has not returned to the computer 30 with the phone 40 for a session timeout duration, hence the session is terminated and access to the application is disabled.

Figure 7:
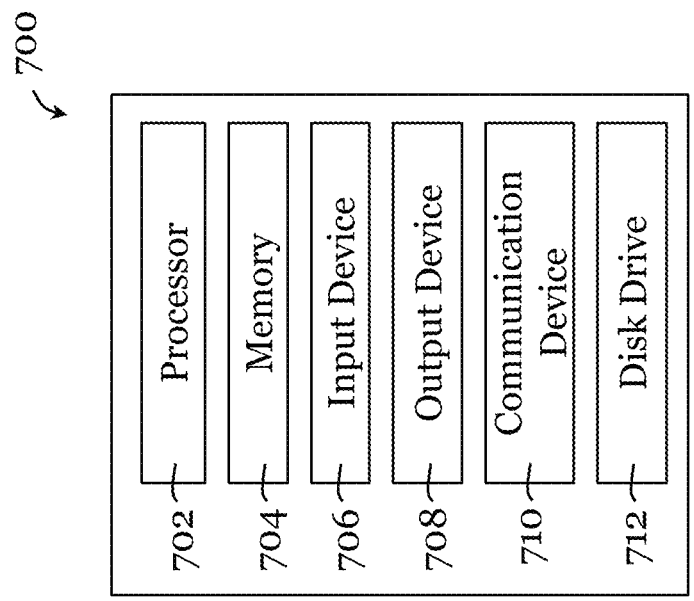
FIG. 7 is a functional block diagram of an information handling system arranged to perform at least part of a method for managing operation of an application in one embodiment of the invention.

FIG. 7 is a block diagram of an information handling system 700 arranged to perform at least part of the computer-implemented method embodiments in one embodiment of the invention. For example, the information handling system 700 may be used to perform part of or all of the methods and/or operations in FIGS. 1, 2, 4, and 5. For example, the information handling system 700 may be used to provide the user device (such as phone 20, 40) and/or the electronic device (such as laptop computer 10, 30). The information handling system 700 may be a generic information handling system or may be a dedicated information handling system.

As shown in FIG. 7, the information handling system 700 generally comprises suitable components necessary to receive, store, and execute appropriate computer instructions, commands, or codes. The main components of the information handling system 700 are a processor 702 and a memory (storage) 704. The processor 702 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process signals and/or information and/or data. The memory 704 may include one or more volatile memory (such as RAM, DRAM, SRAM), one or more non-volatile memory (such as ROM, PROM, EPROM, EEPROM, FRAM, MRAM, FLASH, SSD, NAND, and NVDIMM), or any of their combinations. Appropriate computer instructions, commands, codes, information and/or data may be stored in the memory 704. Instructions for performing the method methods and/or operations in FIGS. 1, 2, 4, and 5 may be stored in the memory 704.

Optionally, the information handling system 700 further includes one or more input devices 706. Examples of such input device 706 include one or more of: keyboard, mouse, stylus, image scanner, microphone, tactile/touch input device (e.g., touch sensitive screen), image/video input device (e.g., camera), etc.

Optionally, the information handling system 700 further includes one or more output devices 708. Examples of such output device 708 include one or more of: display (e.g., monitor, screen, projector, etc.), speaker, disk drive, headphone, earphone, printer, additive manufacturing machine (e.g., 3D printer), etc. The display may include a LCD display, a LED/OLED display, or any other suitable display that may or may not be touch sensitive.

The information handling system 700 may further include one or more disk drives 712 which may encompass one or more of: solid state drive, hard disk drive, optical drive, flash drive, magnetic tape drive, etc. A suitable operating system may be installed in the information handling system 700, e.g., on the disk drive 712 or in the memory 704. The memory 704 and the disk drive 712 may be operated by the processor 702.

Optionally, the information handling system 700 also includes a communication device 710 for establishing one or more communication links (not shown) with one or more other computing devices such as servers, personal computers, terminals, tablets, phones, watches, or wireless or handheld computing devices. The communication device 710 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In some embodiments, the processor 702, the memory 704, and optionally the input device(s) 706, the output device(s) 708, the communication device 710 and the disk drives 712 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. The information handling system 700 may be implemented on a single apparatus or distributed across multiple apparatuses.

A person skilled in the art would appreciate that the information handling system 700 shown in FIG. 7 is exemplary and that the information handling system 700 can have different configurations (e.g., additional components, fewer components, etc.) in other embodiments.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Feature(s) in one embodiment may be selectively combined with feature(s) in another embodiment to form new embodiment(s). For example, the invention may not be limited to managing operation of applications, but can be extended to be applied to electronic documents.

The invention claimed is:

1. A computer-implemented method for managing operation of an application, comprising:
   authenticating a user of the application, wherein the application comprises a secured application that requires user authentication prior to providing access;
   establishing a session with the application and enabling access to the application for the user when the user is authenticated;
   determining, after the user is authenticated, whether the user is or remains present;
   maintaining the session and the enabling of access to the application when it is determined that the user is or remains present; and
   terminating the session and disabling access to the application when it is determined that the user is absent for a first predetermined duration,
   wherein the authentication of the user is performed after the user has logged on to the application,
   wherein after the session is terminated and the access to the application is disabled, the user has to log on to the application and repeat the authenticating in order to gain access to the application, and
   wherein the computer-implemented method further comprises maintaining the session and temporarily disabling access to the application when it is determined that the user is absent for a second predetermined duration shorter than the first predetermined duration.

2. The computer-implemented method of claim 1, wherein the authenticating of the user comprises: authenticating the user based on biometric information of the user.

3. The computer-implemented method of claim 2, wherein the biometric information of the user comprises at least one of: fingerprint information, palm print information, facial information, iris information, finger vein pattern information, palm vein pattern information, retina information, scleral vein information, gait information, hand geometry information, finger geometry information, keystroke information, and voice information.

4. The computer-implemented method of claim 2, wherein the authentication of the user is further based on motion or movement information of the user.

5. The computer-implemented method of claim 1, wherein the authenticating of the user is performed via or by a user device operably connected with an electronic device on which the application is run.

6. The computer-implemented method of claim 1, wherein determining whether the user is or remains present comprises determining whether the user is or remains in proximity of an electronic device on which the application is run.

7. The computer-implemented method of claim 1, further comprising: providing an alert when it is determined that the user is absent or upon determining that the user is absent.

8. The computer-implemented method of claim 1, wherein the computer-implemented method further comprises displaying a warning message or screen on the application when it is determined that the user is absent for the second predetermined duration.

9. The computer-implemented method of claim 1, wherein the computer-implemented method further comprises:
   re-authenticating the user of the application when the user is determined to be absent and then present again before the predetermined duration elapses; and
   continuing the session and re-enabling access to the application when the user is re-authenticated.

10. The computer-implemented method of claim 1,
    wherein the application is a web application; and/or
    wherein the application is a dispute resolution, mediation, and/or arbitration application.

11. A computer-implemented method for managing operation of an application, comprising:
    authenticating a user device associated with a user of the application, wherein the application comprises a secured application that requires user device authentication prior to providing access;
    establishing a session with the application and enabling access to the application for the user when the user device is authenticated;
    determining, after the user device is authenticated, whether the user device is or remains present;
    maintaining the session and the enabling of access to the application when it is determined that the user device is or remains present; and
    terminating the session and disabling access to the application when it is determined that the user device is absent for a first predetermined duration,
    wherein the authentication of the user device is performed after the user has logged on to the application,
    wherein after the session is terminated and the access to the application is disabled, the user has to log on to the application and repeat the authenticating in order to gain access to the application, and
    wherein the computer-implemented method further comprises maintaining the session and temporarily disabling access to the application when it is determined that the user device is absent for a second predetermined duration shorter than the first predetermined duration.

12. The computer-implemented method of claim 11, wherein authenticating the user device comprises: establishing a communication link between the user device and an electronic device on which the application is run.

13. The computer-implemented method of claim 12, wherein the communication link comprises a wireless communication link.

14. The computer-implemented method of claim 11, wherein determining whether the user device is or remains present comprises determining whether the user device is or remains in proximity of an electronic device on which the application is run.

15. The computer-implemented method of claim 14, wherein determining whether the user device is or remains present comprises determining whether a communication link between the user device and the electronic device is maintained.

16. The computer-implemented method of claim 11, further comprising: providing an alert when it is determined that the user device is absent or upon determining that the user device is absent.

17. The computer-implemented method of claim 16, wherein the alert is provided at the user device.

18. The computer-implemented method of claim 11, wherein the computer-implemented method further comprises displaying a warning message or screen on the application when it is determined that the user device is absent for the second predetermined duration.

19. The computer-implemented method of claim 11, wherein the computer-implemented method further comprises:
    re-authenticating the user device when the user device is determined to be absent and then present again before the predetermined duration elapses; and
    continuing the session and re-enabling access to the application when the user device is re-authenticated.

20. The computer-implemented method of claim 11,
    wherein the application is a web application; and/or
    wherein the application is a dispute resolution, mediation, and/or arbitration application.

21. A system for managing operation of an application, comprising:
    one or more processors; and
    a memory storing one or more programs configured to be executed by the one or more processors, the one or more programs including instructions for performing or facilitating performing of a computer-implemented method for managing operation of an application, comprising:
      authenticating a user of the application, wherein the application comprises a secured application that requires user authentication prior to providing access;
      establishing a session with the application and enabling access to the application for the user when the user is authenticated;
      determining, after the user is authenticated, whether the user is or remains present;
      maintaining the session and the enabling of access to the application when it is determined that the user is or remains present; and
      terminating the session and disabling access to the application when it is determined that the user is absent for a first predetermined duration, wherein the authentication of the user is performed after the user has logged on to the application, wherein after the session is terminated and the access to the application is disabled, the user has to log on to the application and repeat the authenticating in order to gain access to the application, and wherein the computer-implemented method further comprises maintaining the session and temporarily disabling access to the application when it is determined that the user is absent for a second predetermined duration shorter than the first predetermined duration.

22. A system for managing operation of an application, comprising:

one or more processors; and a memory storing one or more programs configured to be executed by the one or more processors, the one or more programs including instructions for performing or facilitating performing of a computer-implemented method for managing operation of an application, comprising:

authenticating a user device associated with a user of the application, wherein the application comprises a secured application that requires user device authentication prior to providing access;

establishing a session with the application and enabling access to the application for the user when the user device is authenticated;

determining, after the user device is authenticated, whether the user device is or remains present;

maintaining the session and the enabling of access to the application when it is determined that the user device is or remains present; and terminating the session and disabling access to the application when it is determined that the user device is absent for a first predetermined duration, wherein the authentication of the user device is performed after the user has logged on to the application, wherein after the session is terminated and the access to the application is disabled, the user has to log on to the application and repeat the authenticating in order to gain access to the application, and wherein the computer-implemented method further comprises maintaining the session and temporarily disabling access to the application when it is determined that the user device is absent for a second predetermined duration shorter than the first predetermined duration.

* * * * *